United States Patent
Silverstein et al.

(10) Patent No.: US 11,900,106 B2
(45) Date of Patent: Feb. 13, 2024

(54) PERSONALIZED PATCH NOTES BASED ON SOFTWARE USAGE

(71) Applicant: INTERNATIONAL BUSINESS MACHINES CORPORATION, Armonk, NY (US)

(72) Inventors: Zachary A. Silverstein, Georgetown, TX (US); Jacob Ryan Jepperson, St. Paul, MN (US); Spencer Thomas Reynolds, Austin, TX (US); Jeremy R. Fox, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/653,155

(22) Filed: Mar. 2, 2022

(65) Prior Publication Data

US 2023/0281008 A1    Sep. 7, 2023

(51) Int. Cl.
G06F 8/73    (2018.01)

(52) U.S. Cl.
CPC ..................... *G06F 8/73* (2013.01)

(58) Field of Classification Search
CPC .............. G06F 8/73; G06F 8/71; G06F 8/70
See application file for complete search history.

(56) References Cited

U.S. PATENT DOCUMENTS

| | | | |
|---|---|---|---|
| 6,119,165 A | 9/2000 | Li | |
| 6,862,581 B1 | 3/2005 | Lambiase | |
| 7,096,464 B1 | 8/2006 | Weinmann | |
| 7,516,438 B1 | 4/2009 | Leonard | |
| 10,042,625 B2 | 8/2018 | El Maghraoui | |
| 11,461,093 B1* | 10/2022 | Edminster | G06F 8/60 |
| 11,563,781 B2* | 1/2023 | Reynolds | G10L 15/22 |
| 2004/0237068 A1 | 11/2004 | Ren | |
| 2009/0031301 A1 | 1/2009 | D'Angelo | |
| 2010/0131939 A1* | 5/2010 | Hieb | G06F 8/73 |
| | | | 717/169 |
| 2015/0363185 A1* | 12/2015 | Garratt | G06F 8/60 |
| | | | 717/168 |
| 2019/0042129 A1* | 2/2019 | Tarango | G06F 11/3034 |

(Continued)

FOREIGN PATENT DOCUMENTS

AU    2009266334 B2    11/2012

OTHER PUBLICATIONS

Mathur et al. "They Keep Coming Back Like Zombies": Improving Software Updating Interfaces. USENIX, The Advanced Computing Systems Association, Twelfth Symposium on Usable Privacy and Security ({SOUPS} 2016). Jun. 22-24, 2016, 17 Pgs, <https://www.unsenix.org/conference/soups2016/technical-sessions/presentation/mathur>.

(Continued)

*Primary Examiner* — Wei Y Zhen
*Assistant Examiner* — Amir Soltanzadeh
(74) *Attorney, Agent, or Firm* — James L. Olsen

(57) ABSTRACT

Aspects of the present disclosure relate to personalized software release note generation. Software usage of a user with respect to a software application can be tracked. Software release notes of the software application can be analyzed with respect to the software usage. Personalized software release notes can be generated for the user based on the analyzing. The personalized software release notes can be presented to the user.

14 Claims, 7 Drawing Sheets

```
                300                                    350
       Software 1 Usage Metrics              Software 2 Usage Metrics Feature 1    251 interactions          Feature 1    534 interactions
   Feature 2    160 interactions          Feature 2    0 interactions
   Feature 3    5 interactions            Feature 3    56 interactions
   Feature 4    0 interactions            Feature 4    103 interactions Interface 1  53 minutes                Interface 1  67 minutes
   Interface 2  7 minutes                 Interface 2  2 minutes
   Interface 3  0 minutes                 Interface 3  323 minutes
   Interface 4  654 minutes               Interface 4  75 minutes
```

(56) References Cited

U.S. PATENT DOCUMENTS

2022/0222067 A1* 7/2022 Courtney .................. G06F 8/62

OTHER PUBLICATIONS

Chandrashekar et al., "Artwork Personalization At Netflix", Netflix Tech. Blog. Dec. 7, 2017, 12 Pgs, <https://netflixtechblog.com/artwork-personaliza . . . >.

Cotton., "How To Make Release Notes Count", Mar. 7, 2017, 7 Pgs, <https://opensource.com/article/17/3/how-to-improve-release-notes>.

IBM, "IBM Quantum Breaks 100-QUBIT Barrier", Downloaded Jan. 28, 2022, 9 Pgs, <htps://www.ibm.com/quantum-computing/>.

IBM, "IBM Watson Marketing is Now Acoustic", Downloaded Jan. 28, 2022, 2 Pgs, <https://www.ibm.com/us-en/marketplace/real-time-personalization>.

Jordan., "[Video] Best Practices for Creating & Managing Release Notes (Part One)", Nov. 18, 2020, Publishing, Webinars, 9 Pgs, <https://heretto.com/best-practices-for-creating- . . . >.

Karlsson et al., "Privacy-enabled Recommendations for Software Vulnerabilities." 2019 IEEE Intl Conf on Dependable, Autonomic and Secure Computing, Intl Conf on Pervasive Intelligence and Computing, Intl Conf on Cloud and Big Data Computing, Intl Conf on Cyber Science and Technology Congress (DASC/PiCom/CBDCom/CyberSciTech). DOI 10.1109/DASC/PiCom/CBDCom/CyberSciTech, @ 2019 IEEE, 8 pgs.

Mathur et al. "They Keep Coming Back Like Zombies": Improving Software Updating Interfaces. USENIX, The Advanced Computing Systems Association, Twelfth Symposium on Usable Privacy and Security ({SOUPS} 2016). Jun. 22-24, 2016, 17 Pgs, <https://www.unsenix.org/conference/soups2016/technical-sessions/presentation/mathu>.

Mell et al., "The NIST Definition of Cloud Computing", National Institute of Standards and Technology, Special Publication 800-145, Sep. 2011, 7 pages.

Mullin., "Why Content Personalization is Not Web Personalization (And What To Do About It)", Sep. 4, 2019, 81 Pgs, <https://cxl.com/blog/web-personalization/>.

* cited by examiner

300
Software 1 Usage Metrics

| | |
|---|---|
| Feature 1 | 251 interactions |
| Feature 2 | 160 interactions |
| Feature 3 | 5 interactions |
| Feature 4 | 0 interactions |
| | |
| Interface 1 | 53 minutes |
| Interface 2 | 7 minutes |
| Interface 3 | 0 minutes |
| Interface 4 | 654 minutes |

350
Software 2 Usage Metrics

| | |
|---|---|
| Feature 1 | 534 interactions |
| Feature 2 | 0 interactions |
| Feature 3 | 56 interactions |
| Feature 4 | 103 interactions |
| | |
| Interface 1 | 67 minutes |
| Interface 2 | 2 minutes |
| Interface 3 | 323 minutes |
| Interface 4 | 75 minutes |

FIG. 3

PERSONALIZED PATCH NOTES BASED ON SOFTWARE USAGE

BACKGROUND

The present disclosure relates generally to the field of computing, and in particular, to generating personalized patch notes for users based on software usage.

Patch notes (e.g., release notes) document changes in software that are in development or are updated over time. Patch notes typically highlight an overview of changes, bug fixes, new features, and the like in a formatted document upon an update release. This can allow users to view the updates to the software such that they can identify bug fixes, added features, and the like.

SUMMARY

Embodiments of the present disclosure are directed to a method, system, and computer program product for personalized release note generation. Software usage of a user with respect to a software application can be tracked. Software release notes of the software application can be analyzed with respect to the software usage. Personalized software release notes can be generated for the user based on the analyzing. The personalized software release notes can be presented to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 is a diagram depicting example software usage metrics, in accordance with embodiments of the present disclosure.

Figure 1:
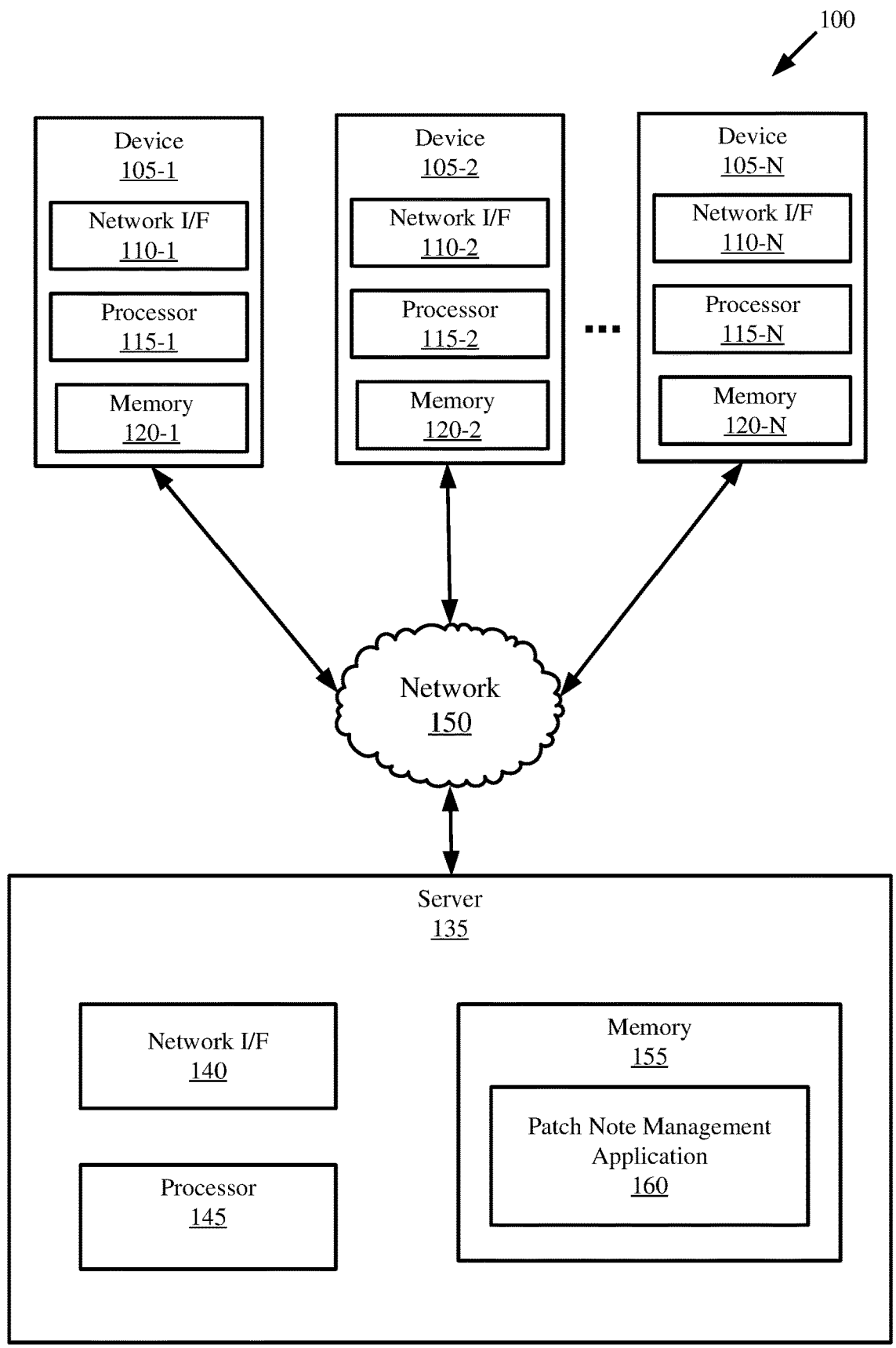
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to computing, and in particular, to generating personalized patch notes for users based on software usage. While the present disclosure is not necessarily limited to such applications, various aspects of the disclosure can be appreciated through a discussion of various examples using this context.

Patch notes (e.g., release notes) document changes in software that are in development or are updated over time. Patch notes typically highlight an overview of changes, bug fixes, new features, and the like in a formatted document upon an update release. This can allow users to view the updates to the software such that they can identify bug fixes, added features, and the like.

However, users typically do not have a feasible nor efficient means to understand how a software upgrade personally affects them and their use of the software at the time of the update release. Patch notes are typically lengthy and not organized in any particular manner for different users. Due to the above, adoption of software updates, when optional, may be relatively low as users are unable to conveniently glean how the software upgrade benefits their personal usage. This can be problematic as certain updates include critical security and/or functionality updates. Aspects of the present disclosure recognize there are several shortcomings in the current implementation and release of patch notes.

Aspects of the present disclosure relate to personalized release note (i.e., patch note) generation. Software usage of a user with respect to a software application can be tracked (e.g., a number of interactions with software features and a time spent viewing software features can be determined). Software release notes of the software application can be analyzed with respect to the software usage (e.g., using natural language processing (NLP) methods, such as keyword searching). Personalized software release notes can be generated for the user based on the analyzing (e.g., the software release notes can be re-organized/modified based on the software usage). The personalized software release notes can be presented to the user.

Aspects of the present disclosure advantageously enable the generation of personalized patch notes for users based on their specific software usage. For example, based on software features the user frequently uses and/or views, personalized patch notes can be generated based on an original set of patch notes. This can allow a user to quickly identify changes to software that impact them most. This may increase adoption of software updates, as users may be more likely to adopt patches upon identifying software features they use that are improved. This can consequently reduce security concerns associated with users not adopting new software updates.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . .

120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a patch note management application 160. The patch note management application 160 can be configured to generate personalized patch notes for users based on their software usage (e.g., historical software usage) associated with software over time.

The patch note management application 160 can be configured to track software usage of software over time. Any suitable type of software can be tracked, including software applications (e.g., word processing applications, design applications, network applications, streaming applications, etc.) and/or operating systems (OS). In embodiments, the patch note management application 160 can be configured to track usage of multiple software products simultaneously. Tracking software usage includes determining the frequency that a user engages with software features within respective software products. For example, the patch note management application 160 can be configured to track aspects of a graphical user interface (GUI) a user engages with, functional features a user engages with, time spent viewing particular software features, etc. Tracking of software features yields usage metrics (e.g., metrics indicating usage of software features within software) that can be used to generate personalized patch notes.

The patch note management application can be configured to receive patch notes associated with an update release. The patch notes can be a comprehensive document detailing all changes made to software upon an update release (e.g., a new version of the software being rolled out). The patch notes can be analyzed with respect to the usage metrics associated with the software such that the patch notes can be modified (e.g., personalized) based on the usage metrics.

The patch note management application 160 then analyzes the patch notes of the software with respect to the obtained usage metrics of the software. In embodiments, the patch note management application 160 uses natural language processing (NLP) and/or machine learning (ML) techniques to analyze the patch notes with respect to the obtained usage metrics. For example, analyzing the patch notes can include keyword searching within the patch notes based on individual usage metrics. The keywords searched within the patch notes can be used to reorganize/tailor/personalize the patch notes based on the keywords associated with frequently used software features. Examples of products that can be used to perform NLP/ML analysis of the patch notes with respect to the usage metrics include IBM Watson® Discovery and IBM Watson® Natural Language Understanding.

Upon analyzing the software patch notes with respect to the software usage, patch note management application 160 can be configured to generate personalized patch notes based on the analysis. In embodiments, generating personalized patch notes can include reorganizing the patch notes based on frequently used software features. In embodiments, generating personalized patch notes can include extracting text from the patch notes based on the usage metrics and generating a new patch note document personalized for the user. In embodiments, generating personalized patch notes can include indicating features that a user frequently uses that have been updated. In embodiments, the personalized patch notes can indicate the user's historical software usage of various software features that have been updated such that the user is aware of the frequency in which they engage various features of the software.

In embodiments, upon presenting the personalized patch notes to the user, feedback can be requested from the user regarding whether they are satisfied or dissatisfied with the personalized patch notes. The feedback can then be input into a machine learning algorithm configured to modify thresholds/conditions used for generating personalized patch notes (e.g., the thresholds/conditions discussed with respect to FIG. 3). This can allow improvement in the thresholds/conditions used to automatically generate personalized patch notes.

Machine learning (ML) and artificial intelligence (AI) techniques can be used by the patch note management application 160 to modify thresholds/conditions used for generating personalized patch notes based on software usage. ML and AI algorithms that can be used by the patch note management application 160 include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the patch note management application 160 (e.g., feedback regarding the generation of personalized patch notes, threshold/conditions used to generate personalized patch notes, etc.) can be analyzed or utilized as training data using any of the aforementioned machine learning algorithms.

More specifically, the ML and AI algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML and AI techniques.

Though this disclosure pertains to the collection of personal data (e.g., software usage), it is noted that in embodiments, users opt-in to the system (e.g., the patch note management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
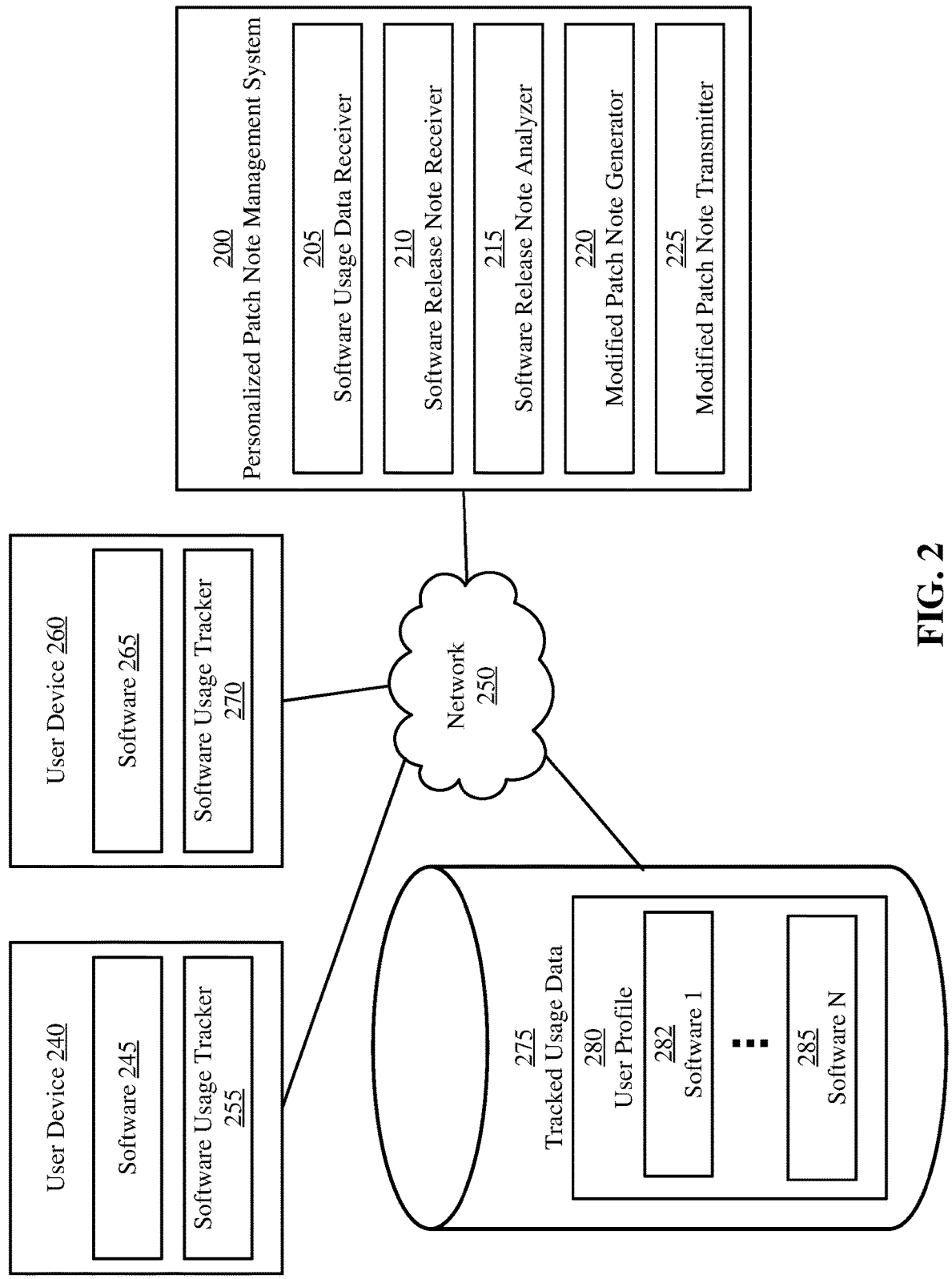
FIG. 2 is a block diagram illustrating an example internet of things (IoT) environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a personalized patch note management system 200, a user device 240, a user device 260, and tracked usage data 275. The various components within the IoT environment can be processor executable instructions that can be executed by a dedicated or shared processor using received inputs.

The personalized patch note management system 200 can be configured to manage the generation of personalized patch notes for users of various software products. The personalized patch note management system 200 can be configured to receive usage metrics (e.g., tracking data) of software and personalize patch notes of software based on the usage metrics. The personalized patch note management system 200 includes a software usage data receiver 205, a software release note receiver 210, a software release note analyzer 215, a modified patch note generator 220, and a modified patch note transmitter 225. The software usage data receiver 205, software release note receiver 210, software release note analyzer 215, modified patch note generator 220, and modified patch note transmitter 225 can be processor executable instructions that can be executed by a dedicated or shared processor using received inputs.

The software usage data receiver 205 can be configured to receive tracking data associated with software 245 and 265 of user devices 240 and 260, respectively. In embodiments, software usage trackers 255 and 270 associated with user devices 240 and 260 can be configured to track software usage on each respective device. However, in embodiments, the functionality of software usage trackers 255 and 270 can be completed by patch note management system 200 or a remote processing system (not shown).

The software usage data can include data pertaining to the usage of various features within software 245 and 265. In embodiments, the software usage data includes a frequency a user engages with each feature of software. For example, software usage trackers 255 and 270 can determine a number of times a particular interactable element (e.g., a button, switch, etc. pertaining to a particular software feature) has been interacted with by a user over a given time period. As another example, software usage trackers 255 and 270 can determine a number of times a particular functionality of an application (e.g., spellcheck of a word processing application) has been used (e.g., activated) over a given time period. As a specific example, if a given application or operating system has different modes for text input (e.g., typing text versus using swipe text), the software usage trackers 255 and 270 can determine the frequency a user uses each respective type of text input. Ultimately, the frequency each feature is used within tracked software can be used such that patch notes can be personalized to emphasize frequently used features. The use of any suitable software feature can be tracked in any suitable manner such that personalized patch notes can be generated using the software feature use frequency. An example diagram depicting software usage metrics including functional feature interactions tracked over time is shown in FIG. 3.

In embodiments, software usage trackers 255 and 270 can determine the time spent viewing various software features. For example, a time spent within a particular interface (e.g., a first window) within an application can be determined by the software usage trackers 255 and 270. This can be completed for various windows, interfaces, tabs, and display features available within software applications. As an example, a word processing application may have various tabs for performing functionalities on documents (e.g., a "home" tab, a "draw" tab, a "layout" tab, a "review" tab, etc.). In this example, software usage trackers 255 and 270 can be configured to determine the time spent viewing each respective tab within the word processing application. Overall, the time spent viewing particular software features can be used to personalize patch notes for users based on the time spent viewing particular software features. An example diagram depicting time spent viewing various interfaces of software is shown in FIG. 3.

The software usage data can be stored within tracked usage data 275. Though the tracked usage data 275 is shown as remote to user devices 240 and 260 and personalized patch note management system 200, in embodiments, tracked usage data 275 can be stored on user devices 240 and 260 and/or personalized patch note management system 200. As shown in FIG. 2, a user profile 280 is stored within tracked usage data 275 which records software usage data associated with a given user. Though not shown, multiple user profiles can be stored for respective users. The user profile 280 includes tracked usage metrics for a first software 282 to an $n^{th}$ software 285. Thus, usage metrics such as frequency of interaction with software features and time spent viewing particular software features can be stored and associated with each software application within each user profile. This can be used to personalize patch notes for various software that users use.

The software release note receiver 210 can be configured to receive release notes associated with software applications/operating systems. In embodiments, the software release note receiver 210 can request/retrieve release notes upon new software version releases. For example, the software release note receiver 210 can be configured to obtain release notes directly from a software developer or from a software development repository such as GitHub®. In embodiments, software release note receiver 210 can be configured to receive release notes upon a user opting into the personalized patch note management system 200 or upon a specific user request. For example, if a user has delayed adoption of an update to their operating system of their device, the user can request a personalized patch note of the operating system, and the personalized patch note management system 200 can responsively obtain the patch notes for the operating system.

The software release note analyzer 215 can be configured to analyze the obtained patch notes received from the software release note receiver 210 with respect to the software usage data obtained from the software usage data receiver 205. The software release note analyzer 215 can be configured to perform a variety of natural language processing (NLP) techniques on the obtained patch notes such that personalized patch notes can be generated for a user. In embodiments, the software release note receiver 210 can be configured to pre-process the received software patch notes such that the software patch notes are in a form suitable for analysis. Pre-processing can include, among other techniques, formatting, normalization, lemmatization, and noise removal of text within the patch notes. In embodiments, the patch notes can be segmented and/or summarized prior to analysis. Example products configured to analyze patch notes with respect to software usage data include IBM Watson® Discovery and IBM Watson® Natural Language Understanding.

In embodiments, keywords associated with frequently used software features can be searched within the received software patch notes such that personalized patch notes can be generated. The software release note analyzer 215 can be configured to derive (e.g., determine, identify, ascertain, etc.) a set of keywords associated with the usage metrics of software. The set of keywords can be selected based upon frequently used software features indicated within usage metrics. For example, any software feature having a usage frequency exceeding a particular usage threshold (e.g., a number of interactions with a software feature exceeding a threshold number of interactions, a time spent viewing a software feature exceeding a time threshold, etc.) can be selected as a keyword candidate.

Thereafter, the software release note analyzer 215 can be configured to search the software patch notes for the set of keywords derived from the usage metrics. Identified matching keywords within the patch notes can then be used to modify the patch notes. For example, sections of the patch notes relevant to the set of keywords associated with the usage metrics can be integrated into modified patch notes. As an example, if a user frequently uses a design feature of a design application, a keyword describing the design feature can be searched within a recent software patch note release associated with the design application. Thereafter, sections of the patch notes corresponding to the keyword describing the design feature can be extracted, re-organized, or otherwise integrated into personalized patch notes for the user.

Though reference is made to keyword matching of usage metrics within software notes to personalize patch notes for users, in embodiments, individual characters, text segments, numbers, phrases, or any other suitable granularity of text/values can be searched within the patch notes such that mappings between software usage metrics and software patch notes can be completed.

The modified patch note generator 220 can be configured to generate modified patch notes based on the analysis completed by the software release note analyzer 215. In some embodiments, the modified patch note generator 220 modifies the original patch notes. For example, the modified patch note generator 220 can be configured to reorganize the patch notes based on frequently used software features (e.g., frequently used features can be moved to the front/headers of the patch document), remove extraneous information (e.g., software features which are not used by the user) from the patch notes, and emphasize text within the patch notes (e.g., by zooming, bolding, altering font size, or otherwise emphasizing frequently used software features). In some embodiments, the modified patch note generator extracts information from the original patch notes and generates a new patch note document based on software features indicated in the usage data. For example, the modified patch note generator 220 can be configured to extract sections of text corresponding to keywords associated with frequently used software features and compile the extracted text sections into a new patch document. However, any suitable manner of generating personalized patch notes for the user based upon their historical software usage can be completed. The modified patch note transmitter 225 then presents the personalized patch notes to the user.

It is noted that FIG. 2 is intended to depict the representative major components of an example IoT environment. In some embodiments, however, individual components can have greater or lesser complexity than as represented in FIG. 2, components other than or in addition to those shown in FIG. 2 can be present, and the number, type, and configuration of such components can vary.

Referring now to FIG. 3, shown is a diagram depicting stored software usage metrics associated with two software applications, in accordance with embodiments of the present disclosure. As shown in FIG. 3, a first set of usage metrics 300 associated with a first software application and a second set of usage metrics 350 associated with a second software application are stored. The first set of usage metrics 300 indicates that a first feature has had 251 interactions, a second feature has had 160 interactions, a third feature has had 5 interactions, and a fourth feature has had 0 interactions over a given time period (e.g., since a last update, over the last month, over the last year, etc.). The second set of usage metrics 350 indicate that a first feature has had 534 interactions, a second feature has had 0 interactions, a third feature has had 56 interactions, and a fourth feature has had 103 interactions over a given time period. The personalized patch note management system 200 can be configured to generate personalized patch notes based on the software usage metrics 300 and 350.

As an example, assume a first threshold is set such that any feature exceeding 150 interactions is moved to the front of a personalized patch note document and a second threshold is set such that any feature falling below 50 interactions is removed from the patch note document. In this example, features 1 and 2 (251 and 160 interactions, respectively) would be moved to the front of the personalized patch note document for software 1 and features 3 and 4 (5 and 0 interactions, respectively) would be removed from the personalized patch notes for software 1. Similarly, following this example, feature 1 (534 interactions) would be moved to the front of the personalized patch note document for software 2 and feature 2 (0 interactions) would be removed from the personalized patch notes for software 2. Though reference is made to example thresholds and example conditions for integrating/removing information from personalized software patch notes, any suitable thresholds can be specified which dictate any suitable condition for integrating/removing/modifying content to be included within personalized software patch notes. It is noted that the above-referenced software features can be identified/selected for integration in to personalized patch notes from an original patch note document using the methods discussed with respect to FIG. 2 (e.g., based on keyword matching of terms corresponding to the software features).

Additionally, as shown in FIG. 3, time spent viewing interfaces within software are collected as metrics within the first set of usage metrics 300 and the second set of usage metrics 350. The first set of usage metrics 300 indicates that a first interface has been viewed for 53 minutes, a second interface has been viewed for 7 minutes, a third interface has been viewed for 0 minutes, and a fourth interface has been viewed 654 minutes over a given time period (e.g., since a last update). The second set of usage metrics 350 indicates that a first interface has been viewed for 67 minutes, a second interface has been viewed for 2 minutes, a third interface has been viewed for 323 minutes, and a fourth interface has been viewed for 75 minutes. The time spent viewing interfaces indicated withing software usage metrics 300 and 350 can be used to generate personalized patch notes from an original patch note document.

As an example, assume a first threshold is set which indicates that any software interface features which were viewed for over 50 minutes are extracted from original patch notes and integrated into a personalized patch note document and any software interface features which were not viewed over 50 minutes are not extracted from the original patch notes and integrated into the personalized patch note document. In this example, for software 1, only information pertaining to interfaces 1 and 4 would be extracted and integrated into personalized patch notes (e.g., based on keyword matching) for software 1. Similarly, for software 2, only information pertaining to interfaces 1, 3, and 4 would be extracted and integrated into personalized patch notes for software 2. Though reference is made to example thresholds and example conditions for extracting information from original patch notes for integration into personalized software patch notes, any suitable thresholds can be specified which dictate any suitable condition for integrating/removing/modifying content to be included within personalized software patch notes.

In embodiments, machine learning algorithms can be configured to modify the thresholds/conditions discussed above used for generating personalized patch notes (e.g., based on user feedback). This can allow fine-tuning of the threshold/conditions used to automatically generate personalized patch notes. For example, following the example above, if the user indicates that they are dissatisfied with patch notes associated with interface 1 of software 2 being included in the personalized patch notes, then the ML algorithm can be configured to increase the threshold from at least 50 minutes to at least 70 minutes for extraction and integration into personalized patch notes. This would prevent patch notes associated with interface 1 from being integrated within personalized patch notes, yet would ensure personalized patch notes directed to interfaces 3 and 4 are included in the personalized patch notes for software 2. Any suitable modification can be made to any suitable threshold/condition based on user feedback.

Figure 4:
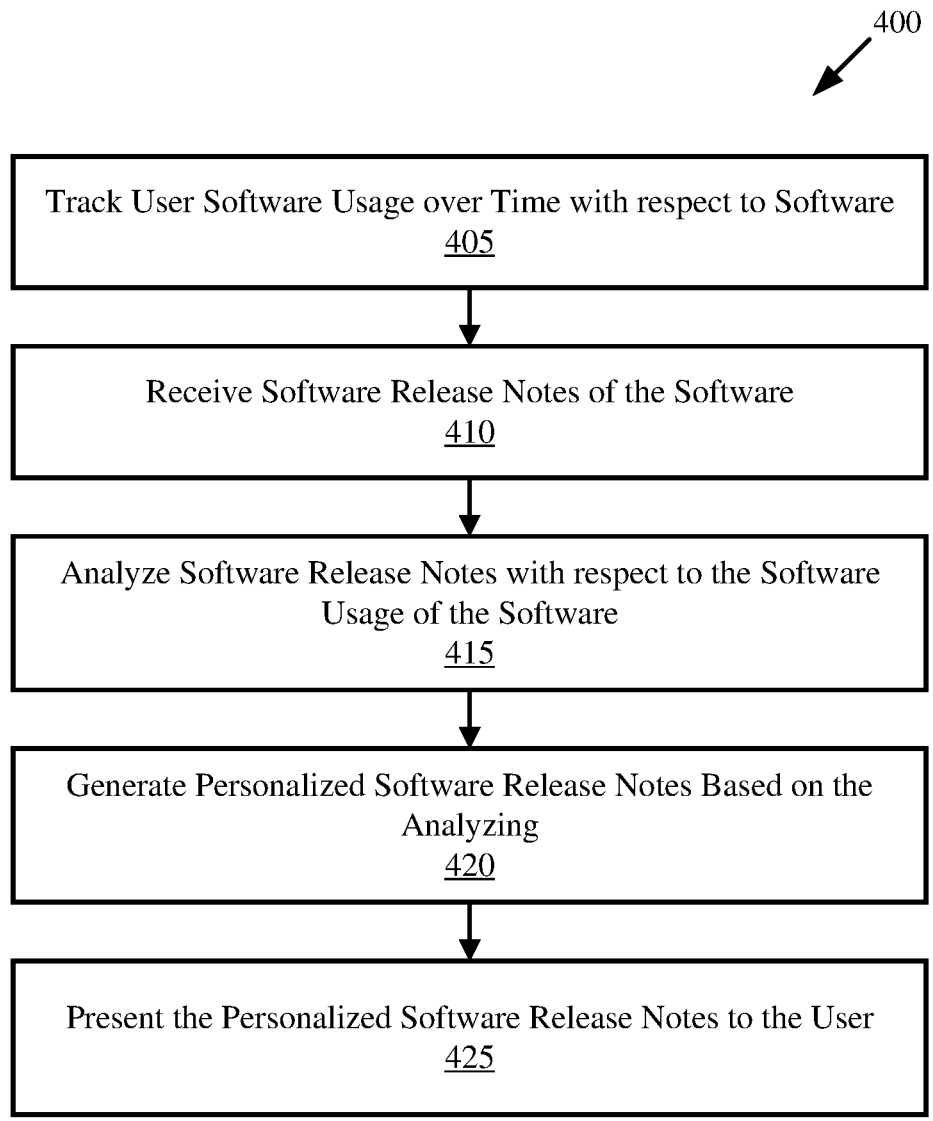
FIG. 4 is a flow-diagram illustrating an example method for personalized patch note generation based on software usage, in accordance with embodiments of the present disclosure.

Referring now to FIG. 4, shown is a flow-diagram illustrating an example method 400 for generating personalized patch notes based on software usage, in accordance with embodiments of the present disclosure. One or more operations of method 400 can be completed by one or more computing devices (e.g., devices 105 or server 135).

Method 400 initiates at operation 405, where user software usage is tracked over time with respect to software. Tracking usage of software can be completed in the same, or a substantially similar manner, as described with respect to FIGS. 1-3. For example, interactions (e.g., activation and use) with specific software features can be tracked over time. Additionally, time spent viewing features (e.g., interfaces and display features) within software can be tracked over time. The usage metrics can be stored within user profiles such that personalized patch notes can be generated for each user of the system.

Software release notes of software are then received. This is illustrated at operation 410. Receiving software release notes (e.g., original patch note documents) can be completed in the same, or a substantially similar manner, as described with respect to FIGS. 1-2. For example, software release notes can be obtained directly from a software developer or from a software repository. In embodiments, software release notes can be obtained in response to a specific user request (e.g., a user opts into the personalized patch note management system 200).

The software release notes are then analyzed with respect to the software usage of the software. This is illustrated at operation 415. Analyzing software release notes with respect to the software usage can be completed in the same, or a substantially similar manner, as described with respect to FIGS. 1-3. For example, natural language processing (NLP) techniques can be used to search keywords/phrases corresponding to frequently used software features within the original patch note documents. Thus, operation 415 yields particular passages of the original patch notes which can be extracted from, removed from, reorganized within, or modified within the original patch note document for preparation of personalized patch notes.

Personalized software release notes are then generated based on the analyzing. This is illustrated at operation 420. Generating personalized patch notes can be completed in the same, or a substantially similar manner, as described with respect to FIGS. 1-3. For example, generating personalized patch notes can include re-organizing/modifying an original patch note document to convert the original patch note document into a personalized patch note document. As another example, generating personalized patch notes can include extracting information from original patch note documents and integrating information into a personalized patch note document. As a specific example, any software features which exceed a threshold number of interactions and a threshold time spent viewing can be moved to the beginning of personalized software release notes for the user. Thresholds (e.g., based on usage metrics, see FIG. 3) and corresponding conditions (e.g., conditions for integrating information into personalized patch notes, removing information from personalized patch notes, modifying information within personalized patch notes, etc.) can be set to dictate the generation of personalized patch notes based on usage metrics.

The personalized software release notes are then presented to the user. This is illustrated at operation 425. The personalized patch notes can be presented to the user in any suitable manner, such as via email, text, or display within the software that was updated upon launching the software.

The aforementioned operations can be completed in any order and are not limited to those described. Additionally, some, all, or none of the aforementioned operations can be completed, while still remaining within the spirit and scope of the present disclosure.

Figure 5:
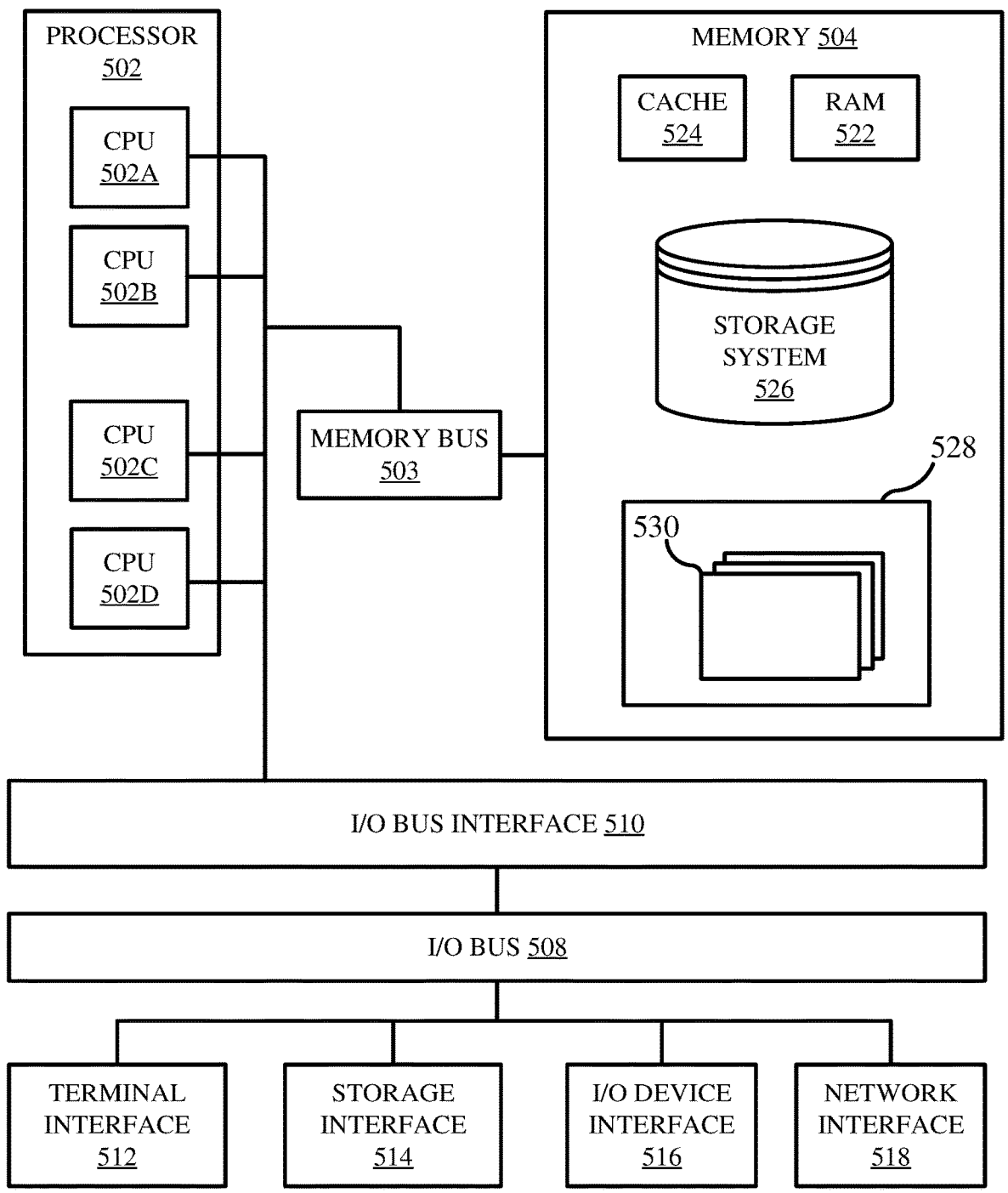
FIG. 5 is a high-level block diagram illustrating an example computer system that can be used in implementing one or more of the methods, tools, modules, and any related functions described herein, in accordance with embodiments of the present disclosure.

Referring now to FIG. 5, shown is a high-level block diagram of an example computer system 501 that may possibly be utilized in various devices discussed herein (e.g., devices 105, server 135, user devices 240 and 260, personalized patch note system 200) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502 (also referred to as processors herein), a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

Memory 504 may include computer system readable media in the form of volatile memory, such as random-access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
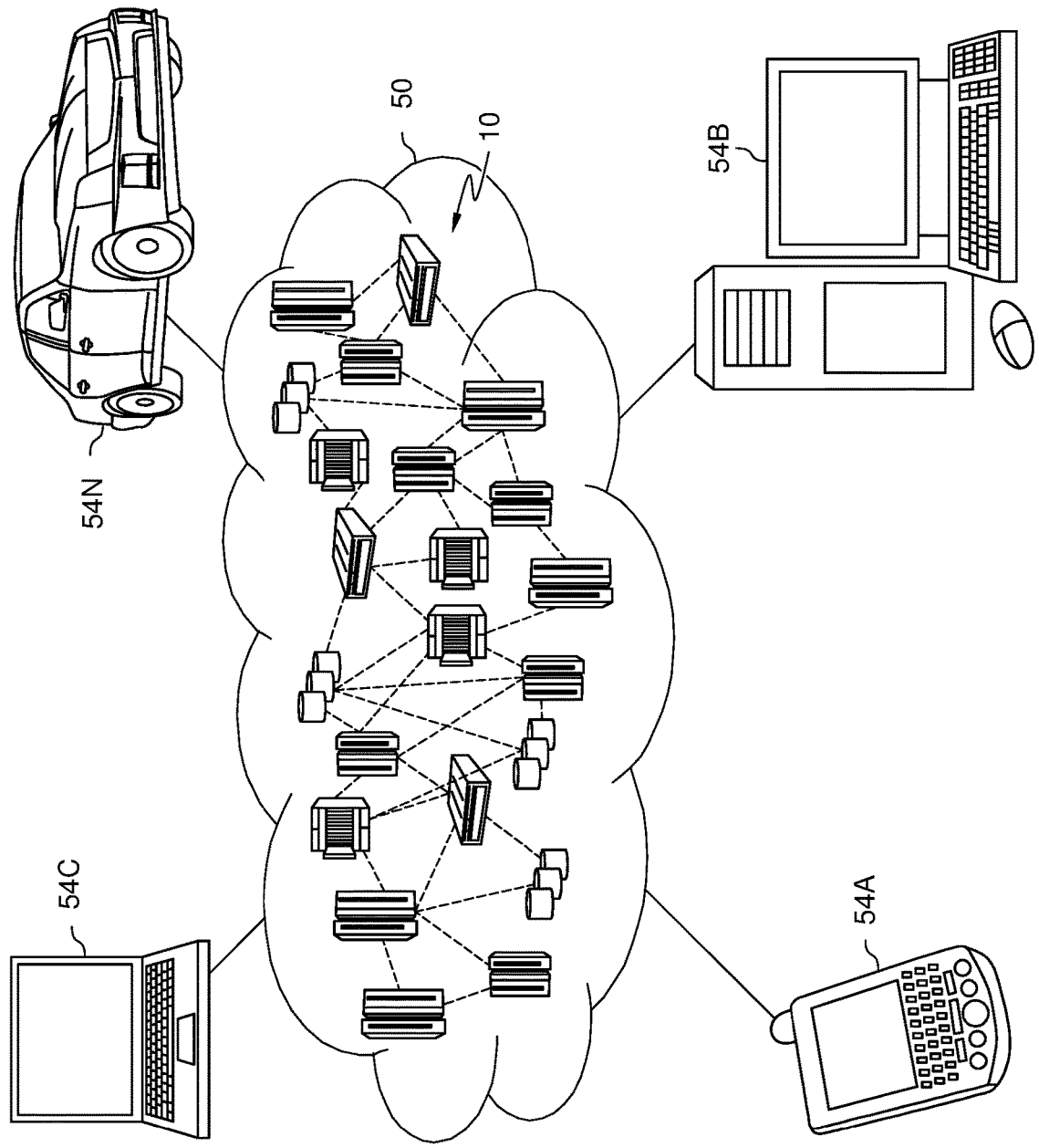
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
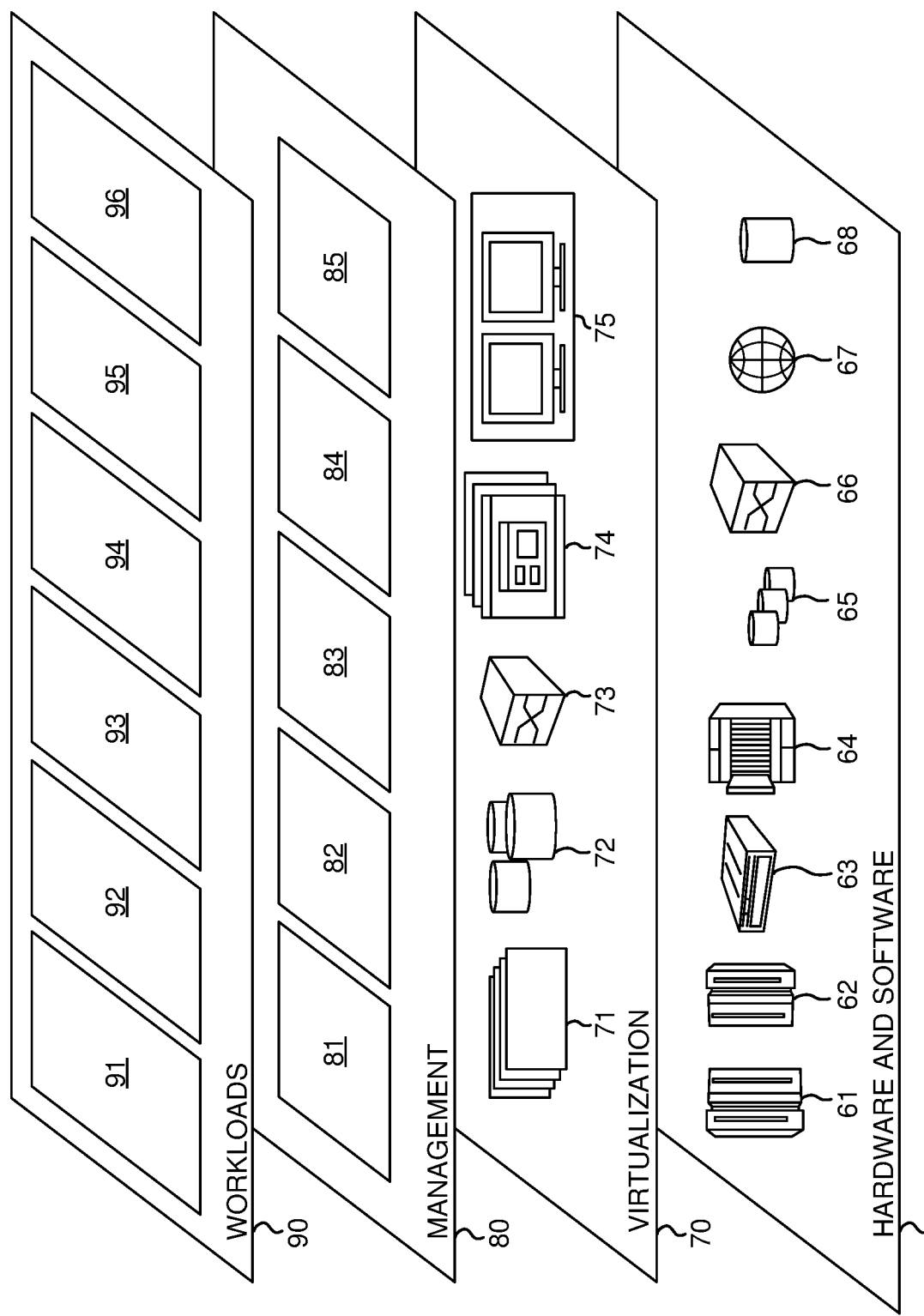
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized patch note generation 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    tracking software usage of a user with respect to a software application, wherein tracking software usage of the user with respect to the software application includes:
        identifying a number of interactions with software features of the software application over a first time period;
    determining a subset of software features of the software application that have a number of interactions exceeding a threshold number of interactions;
    analyzing software release notes of the software application with respect to the software usage by identifying a set of keywords corresponding to the subset of software features and searching for the set of keywords corresponding to the subset of software features within the software release notes;
    generating personalized software release notes for the user by extracting text associated with the set of keywords from the software release notes and integrating the extracted text into the personalized software release notes;
    presenting the personalized software release notes to the user;
    receiving user feedback regarding the user's satisfaction with the personalized software release notes;
    inputting the user feedback into a machine learning algorithm configured to adjust the threshold number of interactions based on the user feedback;
    generating, by the machine learning algorithm, an update to the threshold number of interactions based on the user feedback; and updating the threshold number of interactions based on the update to receive a second threshold number of interactions.

2. The method of claim 1, wherein tracking software usage of a user with respect to the software application further comprises:
identifying a time spent viewing software features of the software application over the first time period.

3. The method of claim 2, wherein only software features which exceed the threshold number of interactions and a threshold time spent viewing are integrated into the personalized software release notes.

4. A system comprising:
one or more processors; and
one or more computer-readable storage media collectively storing program instructions which, when executed by the one or more processors, are configured to cause the one or more processors to perform a method comprising:
tracking software usage of a user with respect to a software application, wherein tracking software usage of the user with respect to the software application includes:
identifying a number of interactions with software features of the software application over a first time period;
determining a subset of software features of the software application that have a number of interactions exceeding a threshold number of interactions;
analyzing software release notes of the software application with respect to the software usage by identifying a set of keywords corresponding to the subset of software features and searching for the set of keywords corresponding to the subset of software features within the software release notes;
generating personalized software release notes for the user by extracting text associated with the set of keywords from the software release notes and integrating the extracted text into the personalized software release notes;
presenting the personalized software release notes to the user;
receiving user feedback regarding the user's satisfaction with the personalized software release notes;
inputting the user feedback into a machine learning algorithm configured to adjust the threshold number of interactions based on the user feedback;
generating, by the machine learning algorithm, an update to the threshold number of interactions based on the user feedback; and
updating the threshold number of interactions based on the update to receive a second threshold number of interactions.

5. The system of claim 4, wherein tracking software usage of a user with respect to the software application further comprises:
identifying a time spent viewing software features of the software application over the first time period.

6. The system of claim 5, wherein only software features which exceed the threshold number of interactions and a threshold time spent viewing are integrated into the personalized software release notes.

7. The system of claim 5, wherein software features which exceed the threshold number of interactions and a threshold time spent viewing are moved to the beginning of the personalized software release notes.

8. A computer program product comprising one or more computer readable storage media, and program instructions collectively stored on the one or more computer readable storage media, the program instructions comprising instructions configured to cause one or more processors to perform a method comprising:
tracking software usage of a user with respect to a software application, wherein tracking software usage of the user with respect to the software application includes:
identifying a number of interactions with software features of the software application over a first time period;
determining a subset of software features of the software application that have a number of interactions exceeding a threshold number of interactions;
analyzing software release notes of the software application with respect to the software usage by identifying a set of keywords corresponding to the subset of software features and searching for the set of keywords corresponding to the subset of software features within the software release notes;
generating personalized software release notes for the user by extracting text associated with the set of keywords from the software release notes and integrating the extracted text into the personalized software release notes;
presenting the personalized software release notes to the user;
receiving user feedback regarding the user's satisfaction with the personalized software release notes;
inputting the user feedback into a machine learning algorithm configured to adjust the threshold number of interactions based on the user feedback;
generating, by the machine learning algorithm, an update to the threshold number of interactions based on the user feedback; and
updating the threshold number of interactions based on the update to receive a second threshold number of interactions.

9. The computer program product of claim 8, wherein tracking software usage of a user with respect to the software application further comprises:
identifying a time spent viewing software features of the software application over the first time period.

10. The computer program product of claim 9, wherein only software features which exceed the threshold number of interactions and a threshold time spent viewing are integrated into the personalized software release notes.

11. The computer program product of claim 9, wherein software features which exceed the threshold number of interactions and a threshold time spent viewing are moved to the beginning of the personalized software release notes.

12. The method of claim 1, further comprising:
determining a second subset of software features of the software application that have a number of interactions exceeding the second threshold number of interactions;
identifying a second set of keywords corresponding to the second subset of software features and searching for the second set of keywords corresponding to the second subset of software features within the software release notes; and
generating updated personalized software release notes for the user by extracting text associated with the second set of keywords from the software release notes and integrating the extracted text into the updated personalized software release notes.

13. The system of claim 4, wherein the method performed by the one or more processors further comprises:
   determining a second subset of software features of the software application that have a number of interactions exceeding the second threshold number of interactions;
   identifying a second set of keywords corresponding to the second subset of software features and searching for the second set of keywords corresponding to the second subset of software features within the software release notes; and
   generating updated personalized software release notes for the user by extracting text associated with the second set of keywords from the software release notes and integrating the extracted text into the updated personalized software release notes.

14. The computer program product of claim 8, wherein the method performed by the one or more processors further comprises:
   determining a second subset of software features of the software application that have a number of interactions exceeding the second threshold number of interactions;
   identifying a second set of keywords corresponding to the second subset of software features and searching for the second set of keywords corresponding to the second subset of software features within the software release notes; and
   generating updated personalized software release notes for the user by extracting text associated with the second set of keywords from the software release notes and integrating the extracted text into the updated personalized software release notes.

\* \* \* \* \*